Jan. 1, 1924

F. J. STOKES

TUBE FILLER

Filed July 12, 1921

WITNESS:

INVENTOR
Francis J. Stokes
BY
Augustus B Stoughton
ATTORNEY.

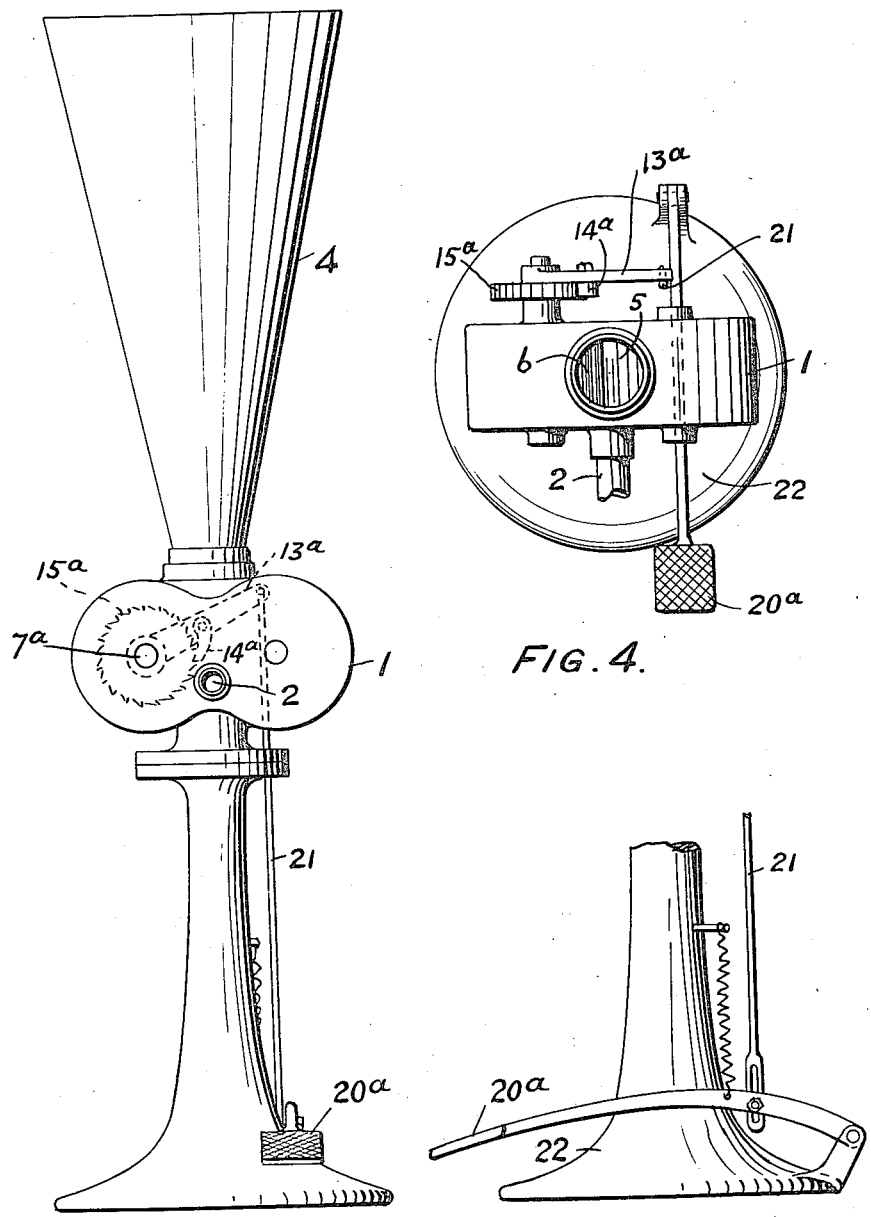

Patented Jan. 1, 1924.

1,479,335

UNITED STATES PATENT OFFICE.

FRANCIS J. STOKES, OF PHILADELPHIA, PENNSYLVANIA.

TUBE FILLER.

Application filed July 12, 1921. Serial No. 484,105.

*To all whom it may concern:*

Be it known that I, FRANCIS J. STOKES, a citizen of the United States, residing at Philadelphia, in the county of Philadelphia and State of Pennsylvania, have invented a new and useful Improvement in Tube Fillers, of which the following is a specification.

The principal object of the present invention is to provide a machine for supplying at each operation a definite but adjustable quantity of paste or the like for filling tubes or containers or for other purposes, and to this and other ends hereinafter set forth, the invention comprises in combination a rotative feeder for feeding the paste or the like, mechanism started by the operator for driving said feeder, control means for compelling said mechanism to complete a cycle of movement with or without devices for timing the action of said mechanism; and the invention further comprises the improvements to be presently described which are applicable both to machines driven by power as well as machines driven by the operator.

The invention will be claimed at the end hereof but will be first described in connection with the embodiments chosen from among other embodiments for illustration in the accompanying drawings forming part hereof and in which—

Fig. 3 is a side view illustrating a modification in which the machine is not driven by power.

Fig. 4 is a top or plan view of the machine shown in Fig. 3 with parts removed, and Fig. 5 is a side view of the base of the machine shown in Fig. 3.

Figure 1:
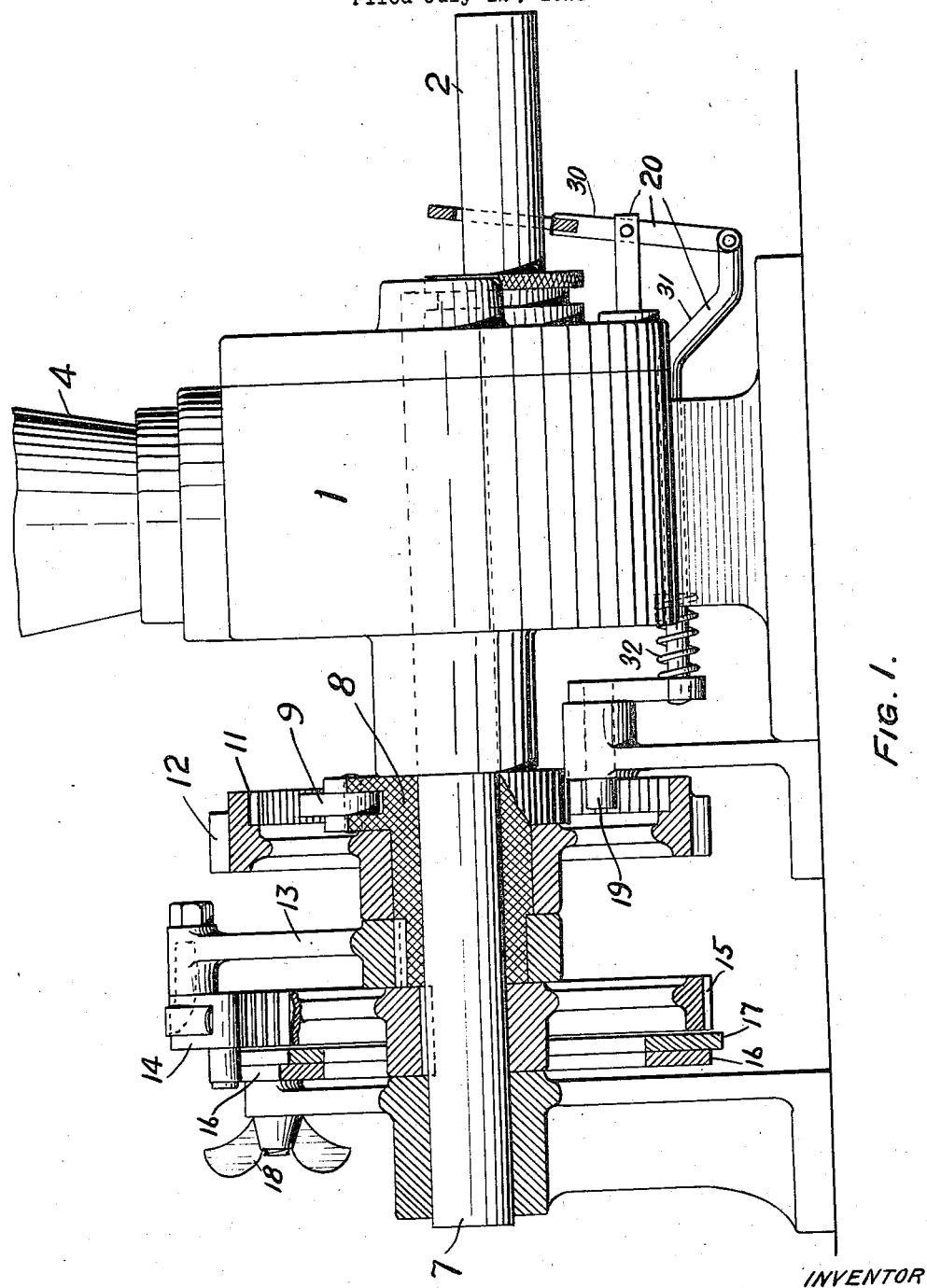
Figure 1 is a side view, partly in section, of a power driven machine embodying features of the invention.

In the drawings 1, generally, is a rotative feeder having an outlet 2 and casing 4 and including, as principal parts, two intermeshing toothed wheels 5 and 6 which expel paste through the outlet 2. The element 3 is not essential and can be omitted and is only present where the feeder is working on material that will not feed properly without it. As shown the part 6 is fast on the shaft 7. The mechanism which is started by the operator for driving the shaft 7 will now be described. 8 is a sleeve loose for turning on the shaft 7 and it is provided with a clutch dog 9 pressed by a spring 10 into engagement with an internally toothed clutch wheel 11 that is continuously driven, for example, through its teeth 12 from a power driven pinion not shown. This clutch wheel is loose for rotation on the sleeve 8 which has keyed to it an arm 13 carrying a spring pressed pawl 14 which is adapted to engage with a ratchet wheel 15 keyed to the shaft 7. 16 and 17 are rings or pawl guards disposed in the line of travel of the pawl 14 and having high parts which hold the pawl out of action and low parts which permit the pawl to come into action, and these rings are turnable and adjustable by means of the thumb nut 18 and they constitute devices for timing the pawl. 19 is a pin which may be interposed in or withdrawn from the line of travel of the clutch dog 9, for example, by means of gear 20 under the control of the operator and shown in Fig. 1 to comprise an element 30 centrally pivoted to a fixed pivot and having the upper end free for operation by the operator and the other end connected by a slidable rod 31, spring pressed by a spring 32 with the pin 19. This pin constitutes control means for permitting the sleeve 8 to complete a cycle of movement.

Figure 2:
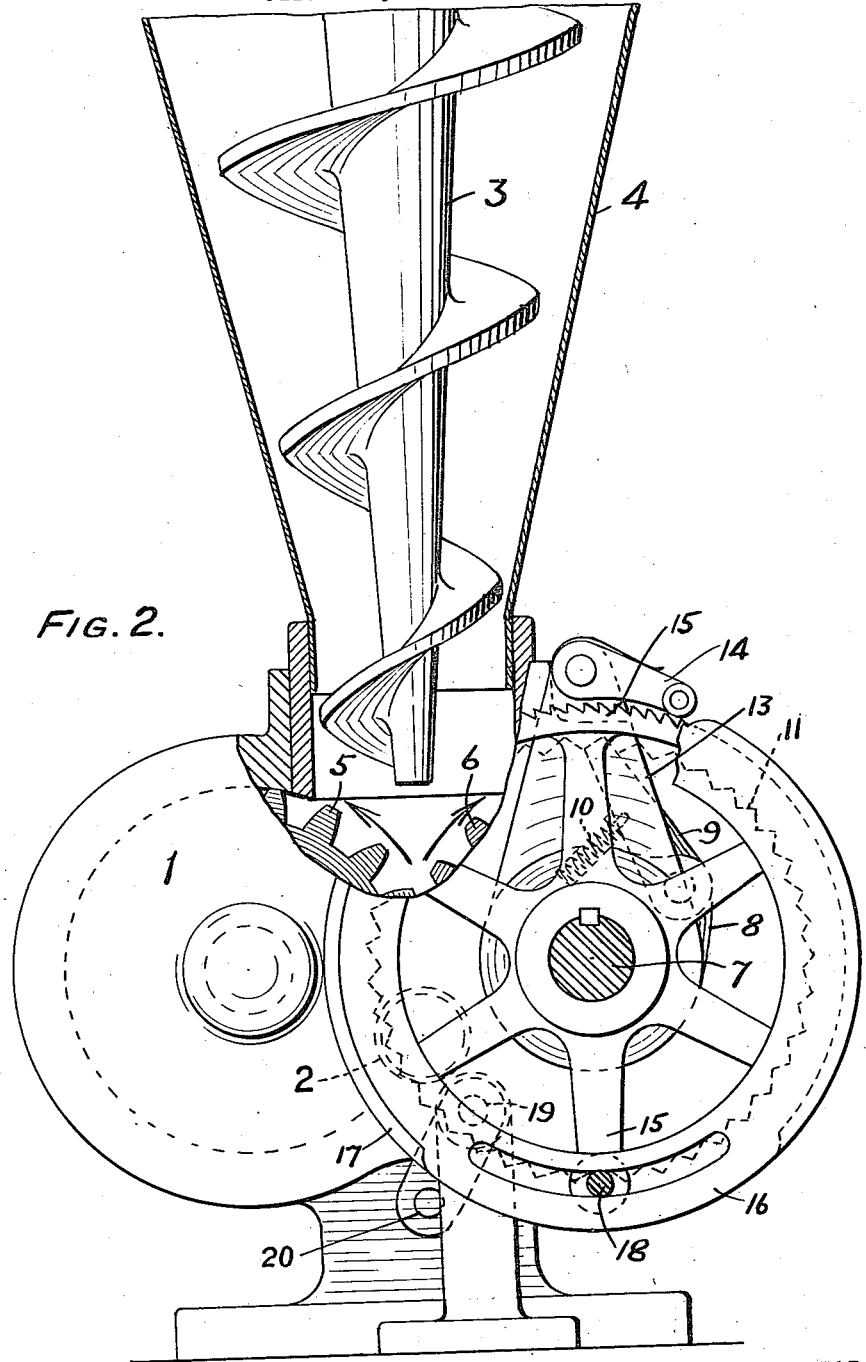
Fig. 2 is an end view of the same, partly in section and with parts broken away.

As shown in the drawings the clutch wheel 12, which is always in motion, is turning clockwise in Fig. 2, and the dog 9 engaging its internal teeth transmits this motion to the sleeve 8, and the sleeve 8 transmits this motion to the pawl 14. The pawl 14, occupying the space provided by low portions of the rings 16 and 17, engages the teeth of the ratchet wheel 15 which in turn drives the shaft 7 and with it the toothed wheels 5 and 6. This condition of affairs continues for one revolution of the clutch wheel 11, which is the cycle of its operation, and upon the completion of one operation the pin 19 disengages the dog 9 so that the sleeve 8 stands still. To start another cycle the operator operates the gear appliance or furnishing 20, withdrawing the pin 19 and permitting the clutch dog to come into action. It has been said that the sleeve 8, when started, makes one complete revolution but the extent of turning of the shaft 7 and therefore the quantity of material fed from the filler is controlled by the adjustment of the rings 16 and 17, the high parts of which throw the pawl 14 out of action and so permit the shaft 7 to come to rest without completing a full revolution and after completing a pre-determined and adjustable part of a revolution.

In general the construction and mode of operation of the modification shown in Figs. 3, 4 and 5 are as above described with the following exceptions or modifications: The pawl 14$^a$ is caused to make a complete stroke when the pedal 20$^a$ is pushed by the operator into contact with its limit stop as 22. The pawl 14$^a$ is carried by an arm 13$^a$ pivoted concentrically with the shaft 7$^a$ and having its free end connected by a rod or link 21 with the spring retracted pedal 20$^a$. Thus the pedal 20$^a$ is mechanism started by the operator and in fact actuated by the operator. The limit stop as 22 is a control means which compels the pedal and pawl 14$^a$ to complete a cycle of movement.

As shown the shaft 7$^a$ is turned through the full stroke of the pawl 14$^a$, but if desired rings or pawl guards such as 16 and 17 shown in Figs. 1 and 2 can be used in the manner there indicated in connection with the pawl 14$^a$ shown in Fig. 3 for the purpose described in connection with Figs. 1 and 2.

In use the operator starts the machine by moving the part 20 or 20$^a$. Thereupon there is delivered from the outlet tube a certain quantity of paste which may be received in a tube applied to the outlet. The machine then stops and the operator applies another tube and again sets the machine in motion.

It will be obvious to those skilled in the art to which the invention relates that modifications may be made in details of construction and arrangement without departing from the spirit of the invention which is not limited as to such matters or otherwise than as the prior art and the appended claim may require.

I claim:

In a machine for filling containers with paste or the like the combination of a rotative feeder having intermeshing toothed wheels operating to suck paste or the like into the housing of the rotative feeder and to expel the same from the housing of the rotative feeder in quantity determined by the distance through which the wheels move, an outlet nozzle communicating with the interior of the housing of the rotative feeder and adapted to receive paste or the like expelled by the toothed wheels and to discharge it into a container, an inlet provided for the housing and through which paste or the like is sucked by the toothed wheels, and means for intermittently rotating said toothed wheels in the same direction through definite distances to eject definite and uniform quantities of paste or the like.

FRANCIS J. STOKES.